United States Patent
Misawa

(10) Patent No.: US 12,008,420 B2
(45) Date of Patent: Jun. 11, 2024

(54) PRINTED-MATERIAL CHECK APPARATUS, IMAGE FORMING APPARATUS, NON-TRANSITORY COMPUTER READABLE MEDIUM, AND PRINTED-MATERIAL CHECK SYSTEM

(71) Applicant: FUJIFILM Business Innovation Corp., Tokyo (JP)

(72) Inventor: Satoshi Misawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 332 days.

(21) Appl. No.: 17/329,161

(22) Filed: May 25, 2021

(65) Prior Publication Data

US 2022/0207310 A1    Jun. 30, 2022

(30) Foreign Application Priority Data

Dec. 24, 2020   (JP) ................................. 2020-214934

(51) Int. Cl.
  *G06K 15/02*   (2006.01)
  *G06F 3/12*    (2006.01)
(52) U.S. Cl.
  CPC ....... *G06K 15/1813* (2013.01); *G06F 3/1204* (2013.01); *G06F 3/123* (2013.01); *G06F 3/1298* (2013.01); *G06K 15/1805* (2013.01); *G06K 15/1836* (2013.01)

(58) Field of Classification Search
  None
  See application file for complete search history.

(56) References Cited

U.S. PATENT DOCUMENTS

2001/0012377 A1* 8/2001 Rhoads .............. H04N 1/32203
  382/100
2013/0136315 A1* 5/2013 Kawamoto .......... G06V 30/418
  382/112

FOREIGN PATENT DOCUMENTS

JP    2010146371    7/2010

* cited by examiner

*Primary Examiner* — Darryl V Dottin
(74) *Attorney, Agent, or Firm* — JCIPRNET

(57) ABSTRACT

A printed-material check apparatus includes a processor configured to: acquire check information including section information and first comparison information from a printed material printed on a basis of print data with check information, the section information identifying a section in print data, the first comparison information being generated from data identified by the section, the print data with check information being generated by adding the check information to the print data; acquire an image of an inner part of a section on the printed material, the section being identified by the acquired check information; and determine whether the printed material is valid by using the first comparison information and the image of the inner part of the section on the printed material.

9 Claims, 6 Drawing Sheets

PRINTED-MATERIAL CHECK APPARATUS, IMAGE FORMING APPARATUS, NON-TRANSITORY COMPUTER READABLE MEDIUM, AND PRINTED-MATERIAL CHECK SYSTEM

CROSS-REFERENCE TO RELATED APPLICATIONS

This application is based on and claims priority under 35 USC 119 from Japanese Patent Application No. 2020-214934 filed Dec. 24, 2020.

BACKGROUND (i) Technical Field

The present disclosure relates to a printed-material check apparatus, an image forming apparatus, a non-transitory computer readable medium, and a printed-material check system.

(ii) Related Art

In a method for performing printing from a personal computer (hereinafter, a PC) by using the printing function of an image forming apparatus, data regarding the printing is transmitted from application software to the printer driver, and the printer driver converts the data to a description in a page description language (PDL) and transmits the description to the image forming apparatus. The image forming apparatus interprets the PDL description in a rasterization process, generates and outputs raster bitmap data, and thereby performs printing on a medium.

The quality of a printed material generated as described above is checked in some cases. For example, in a case where the image forming apparatus checks a printed material by itself not in cooperation with a PC, the image forming apparatus reads the printed material by using the scanning function thereof and compares raster scan data generated by the reading with bitmap data generated by interpreting the PDL description. If the raster scan data matches the bitmap data, the printed material is determined as a valid material. If the raster scan data does not match the bitmap data, the printed material is determined as an invalid material. See, for example, Japanese Unexamined Patent Application Publication No. 2010-146371.

SUMMARY

However, in a case where bitmap data generated by rasterizing print data is compared with data generated by reading a printed material, it is possible to verify an error such as smear attached during printing or a solid black with white microdots but is not possible to detect an error occurring in the rasterization.

Aspects of non-limiting embodiments of the present disclosure relate to enabling the validity of a printed material to be determined without missing an error occurring in the rasterization.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a printed-material check apparatus including a processor configured to: acquire check information including section information and first comparison information from a printed material printed on a basis of print data with check information, the section information identifying a section in print data, the first comparison information being generated from data identified by the section, the print data with check information being generated by adding the check information to the print data; acquire an image of an inner part of a section on the printed material, the section being identified by the acquired check information; and determine whether the printed material is valid by using the first comparison information and the image of the inner part of the section on the printed material.

BRIEF DESCRIPTION OF THE DRAWINGS

An exemplary embodiment of the present disclosure will be described in detail based on the following figures, wherein.

DETAILED DESCRIPTION

Hereinafter, an exemplary embodiment of the present disclosure will be described on the basis of the drawings.

Figure 1:
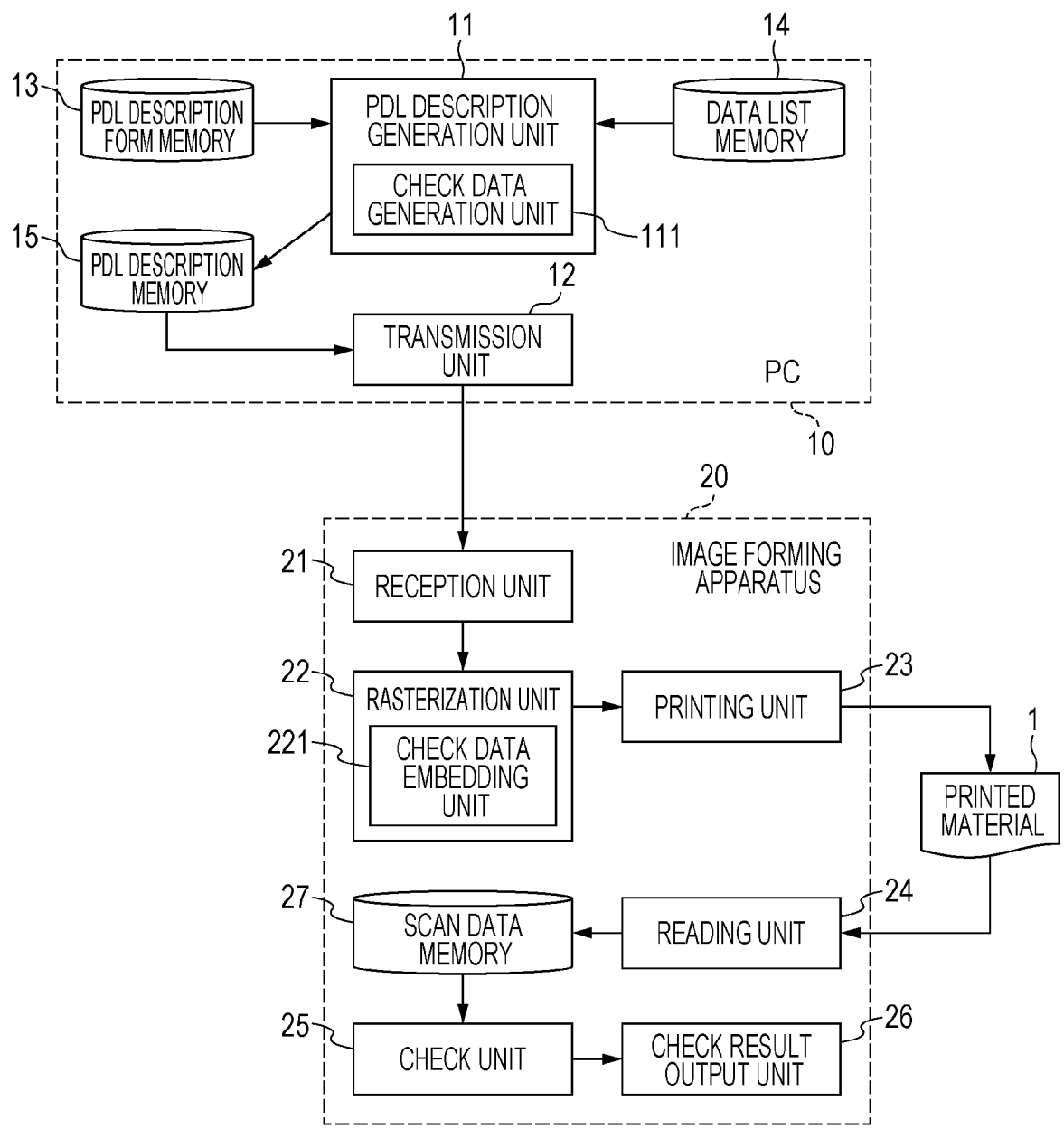
FIG. 1 is a block diagram illustrating an exemplary embodiment of a printed-material check system according to the present disclosure.

FIG. 1 is a block diagram illustrating the exemplary embodiment of a printed-material check system according to the present disclosure. FIG. 1 illustrates a PC 10 and an image forming apparatus 20. The PC 10 and the image forming apparatus 20 are connected together via a network (not illustrated) such as a local area network (LAN) or the Internet, and thereby communication at least from the PC 10 to the image forming apparatus 20 may be performed.

Figure 2:
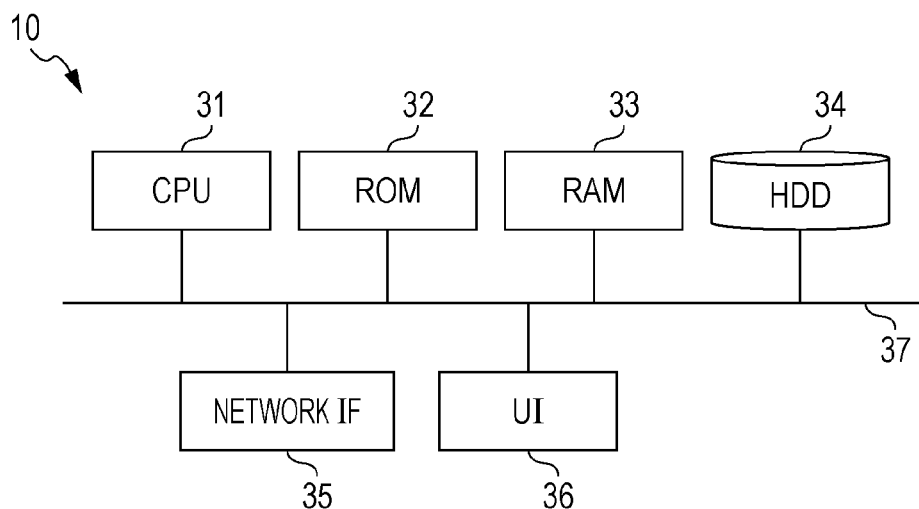
FIG. 2 is a diagram of the hardware configuration of a PC in this exemplary embodiment.

FIG. 2 is a diagram of the hardware configuration of the PC 10 in this exemplary embodiment. The PC 10 in this exemplary embodiment may be implemented in an existing general-purpose hardware configuration. Specifically, as illustrated in FIG. 2, the PC 10 includes a central processing unit (CPU) 31, a read-only memory (ROM) 32, a random-access memory (RAM) 33, a hard disk drive (HDD) 34 serving as a memory, a network interface (IF) 35 provided as a communication medium, and a user interface 36 including an input unit such as a mouse or a keyboard and a display unit such as a display. Each component is connected to an internal bus 37.

Figure 3:
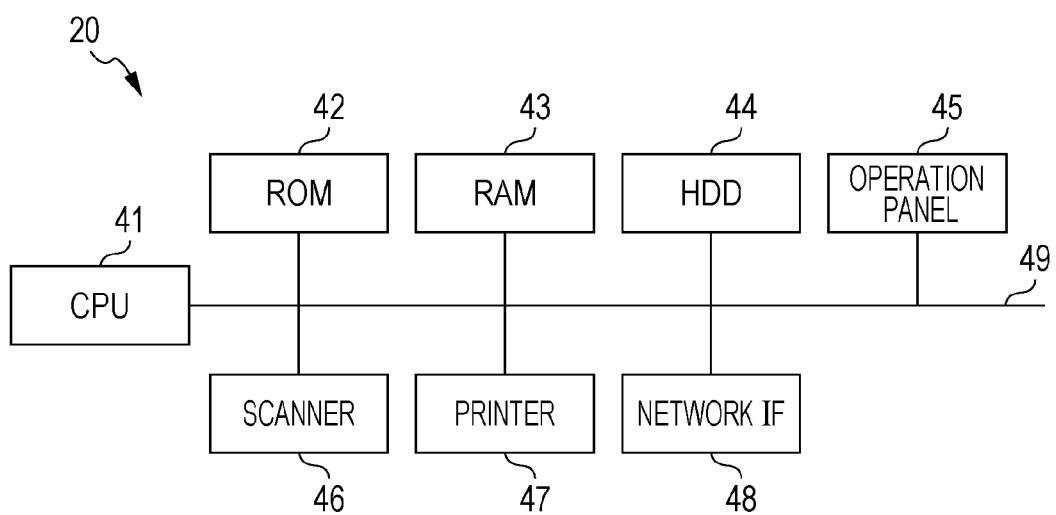
FIG. 3 is a diagram of the hardware configuration of an image forming apparatus in this exemplary embodiment.

FIG. 3 is a diagram of the hardware configuration of the image forming apparatus 20 in this exemplary embodiment. The image forming apparatus 20 is a multifunction printer having various functions such as a printing function, a copying function, and a scanning function and has a computer incorporated therein. In FIG. 3, a ROM 42 stores various programs for controlling the image forming apparatus 20, encrypting electronic data, and transmitting and receiving electronic data. A CPU 41 controls operation of various mechanisms such as a scanner 46 and a printer 47 included in the image forming apparatus 20 in accordance with respective programs stored in the ROM 42. A RAM 43 is used as a work memory in running a program or as a communication buffer in transmitting or receiving electronic data. A HDD 44 stores an electronic document and the like read with the scanner 46. An operation panel 45 receives an instruction from a user and displays information. The scanner 46 reads a document set by the user and accumulates the document as electronic data in the HDD 44 or the like. The printer 47 prints an image on the output sheet in accordance with a control program run by the CPU 41. A network interface (IF) 48 connects the image forming apparatus 20 to the network and is used for exchanging electronic data with an external apparatus, accessing the image forming apparatus 20 via a browser, and the like. An address data bus 49 connects the image forming apparatus 20 to the mechanisms to be controlled by the CPU 41 and performs data communication.

Referring back to FIG. 1, the PC 10 has a PDL description generation unit 11, a transmission unit 12, a PDL description form memory 13, a data list memory 14, and a PDL description memory 15. Components not used for the description of this exemplary embodiment are omitted in FIG. 1.

The PDL description form memory 13 stores a form for PDL descriptions to be generated by the PDL description generation unit 11 (hereinafter, a PDL description form). The data list memory 14 stores a data list including one or more data items to be located in respective one or more predetermined sections in the PDL description form.

Figure 4:
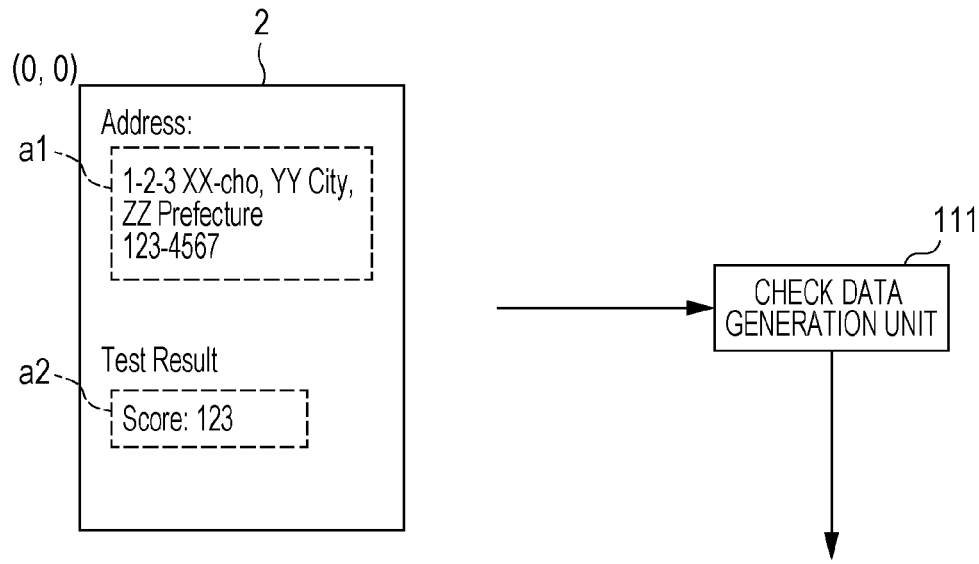
FIG. 4 is a conceptual diagram illustrating how a printed material is generated in this exemplary embodiment.
Figure 4:
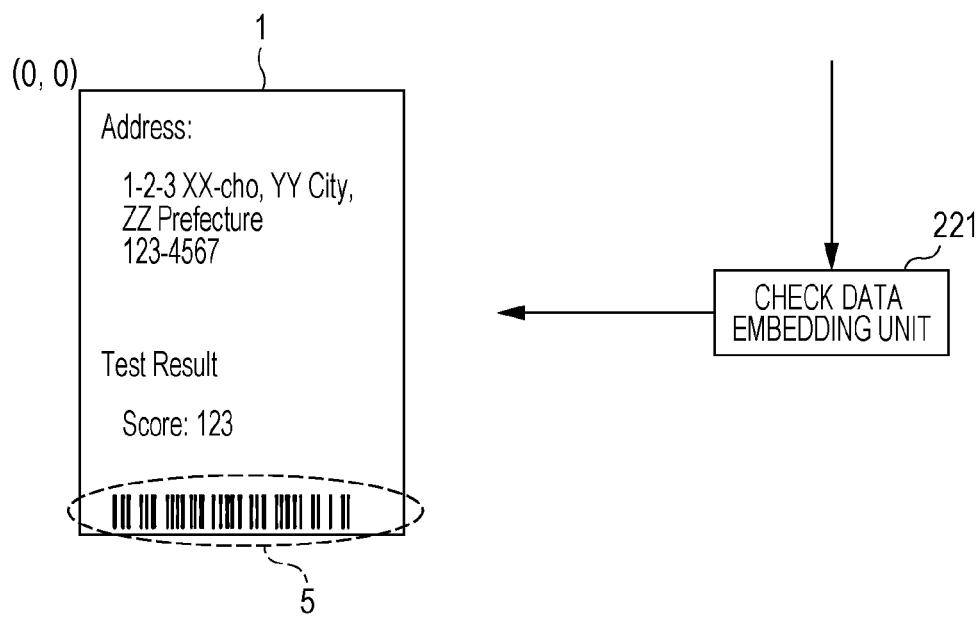

FIG. 4 is a conceptual diagram illustrating how a printed material 1 is generated in this exemplary embodiment. FIG. 4 illustrates a print image 2 based on PDL descriptions generated by the PDL description generation unit 11. The PDL descriptions are generated by locating two data items respectively representing an address and a score indicating a test result in respective predetermined sections a1 and a2 in the PDL description form. The data list memory 14 stores a data list of the data item pairs of the address and the score illustrated in FIG. 4.

The PDL description generation unit 11 reads out the PDL description form stored in the PDL description form memory 13 and the data list stored in the data list memory 14 and generates PDL descriptions to perform printing for the data items, that is, to print an address and a score included in the data list in the respective predetermined sections a1 and a2 in the PDL description form. A check data generation unit 111 in the PDL description generation unit 11 generates check data items as check information for the respective PDL descriptions. The check data items are used for validating the printed material 1 generated on the basis of the generated PDL descriptions. The PDL description generation unit 11 stores each check data item in the PDL description memory 15 in association with the generated corresponding PDL description. The PDL description generation unit 11 generates PDL descriptions the number of which corresponds to the number of data items in the data list. The check data item will be described in detail later.

The transmission unit 12 adds the check data item associated with the PDL description to the PDL description stored in the PDL description memory 15 and transmits the PDL description to the image forming apparatus 20 via the network. The transmission unit 12 may be implemented by a function of the printer driver. The data exchange is not limited to the exchange via the network and may be performed by various methods such as by using a recording medium such as a universal serial bus (USB) memory.

The PDL description generation unit 11 and the transmission unit 12 in the PC 10 are implemented by cooperative operations of the computer serving as the PC 10 and a program run by the CPU 31 included in the computer. The memories 13 to 15 are implemented by the HDD 34 included in the PC 10. Alternatively, the RAM 33 or an external memory may be used via the network.

The image forming apparatus 20 includes a reception unit 21, a rasterization unit 22, a printing unit 23, a reading unit 24, a check unit 25, a check result output unit 26, and a scan data memory 27. Components not used for the description of this exemplary embodiment are omitted in FIG. 1.

The reception unit 21 receives data, that is, pairs of the PDL description and the check data item that are transmitted from the PC 10 via the network. The rasterization unit 22 performs rasterization by using, as input data, the received PDL descriptions and check data items and generates raster bitmap data. A check data embedding unit 221 in the rasterization unit 22 embeds each check data item in a corresponding predetermined embedding location in the bitmap data generated from the PDL descriptions. The printing unit 23 is implemented by the printer 47 and generates the printed material 1 by outputting the bitmap data with the embedded check data items. The reading unit 24 is implemented by the scanner 46. The reading unit 24 generates scan data by reading the printed material 1 and stores the scan data in the scan data memory 27. The scan data is raster bitmap data.

The check unit 25 checks the printed material 1 by using a check code acquired from the scan data regarding the printed material 1 and an image of a section on the printed material 1, that is, an image of the inner part of each of the sections a1 and a2 in this exemplary embodiment. In the checking, the check unit 25 determines whether the printed material 1 is valid. As described above, the check code corresponds to first comparison information compared in checking the printed material 1. The term "whether the printed material 1 is valid" herein denotes whether the printed material 1 is generated in accordance with the PDL description. If the generation of the printed material 1 performed in accordance with the PDL description is verified in the check, the determination result is validness, and the printed material 1 is determined as a valid material. In contrast, if the generation of the printed material 1 performed not in accordance with the PDL description is verified in the check, the determination result is invalidness, and the printed material 1 is determined as an invalid material. As described above, the image forming apparatus 20 in this exemplary embodiment has a function as a printed-material check apparatus for performing a check to determine whether the printed material 1 is valid. The check result output unit 26 outputs a result of determination of whether the printed material 1 is valid, in other words, a result of checking the printed material 1.

The components 21 to 26 of the image forming apparatus 20 are implemented by cooperative operations of the computer included in the image forming apparatus 20 and a program run by the CPU 41 included in the computer. The scan data memory 27 is implemented by the HDD 44 included in the image forming apparatus 20. Alternatively, the RAM 43 or an external memory may be used via the network.

The programs used in this exemplary embodiment may be provided not only through a communication medium but also in such a manner as to be stored in a computer-readable recording medium such as a compact disc (CD)-ROM or a USB memory. The programs provided through the communication medium or the recording medium are installed on the computer, the CPU of the computer runs the programs sequentially, and thereby various processes are achieved.

Operations in this exemplary embodiment will be described.

Figure 5:
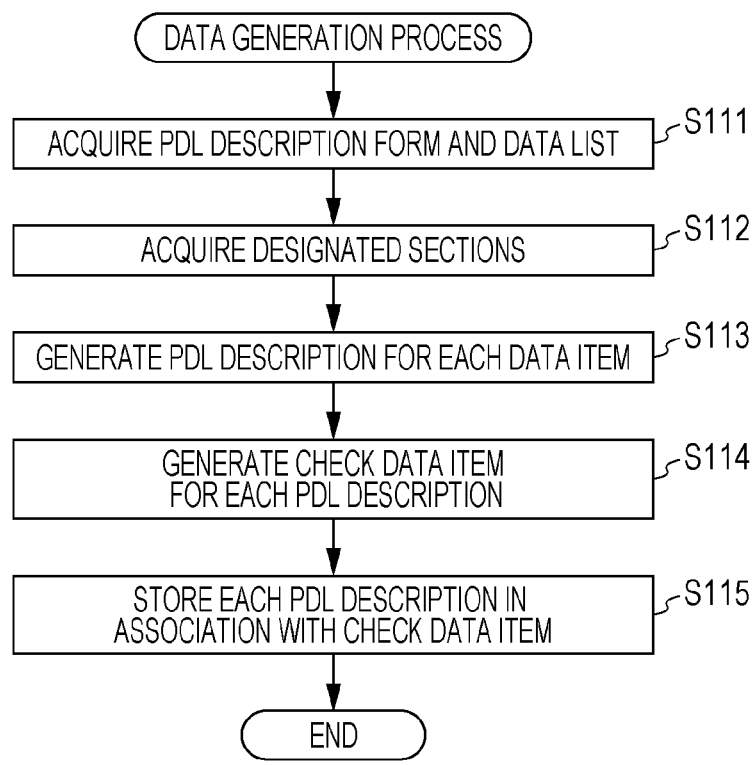
FIG. 5 is a flowchart illustrating a generation process for data used for checking the printed material in this exemplary embodiment.

In this exemplary embodiment, the PDL descriptions generated by the user with the PC 10 are transmitted to the image forming apparatus 20 to perform printing, and the printed material 1 is thus generated. The image forming apparatus 20 functioning as the printed-material check apparatus checks whether the printed material 1 is correctly generated in accordance with the transmitted PDL descriptions. The PC 10 in this exemplary embodiment generates the check data items used for checking the printed material 1. Hereinafter, a generation process for data used for the checking will be described by using a flowchart illustrated in FIG. 5.

In the PC 10, PDL descriptions serving as the original data for the printed material 1 are generated as print data. To generate the PDL descriptions, the PDL description generation unit 11 reads out a PDL description form from the PDL description form memory 13 and also reads out, from the data list memory 14, the data list including data items to be embedded in the PDL description form. Data items required for generating the PDL descriptions are acquired (step S111).

The PDL description generation unit 11 then acquires sections in the image in which the data items (data items corresponding to Address and Score in FIG. 4) included in the data list are to be located when printing is performed in accordance with the PDL descriptions (step S112). The PDL description form in which the data items are embedded is known, and the locations in which the data items are to be embedded in the PDL description form, that is, the aforementioned sections are also known information. Accordingly, the PDL description generation unit 11 acquires section information identifying the aforementioned sections from a predetermined memory area. Alternatively, the user may designate the sections. The section information may also be designated by using coordinates. The sections are identified by coordinate data or the like in the two-dimensional coordinate system with the origin (0, 0) located at a predetermined position such as the upper left corner of the print image. For example, if the section has a rectangular shape, the section information includes coordinate data representing the upper left corner of the section and coordinate data representing the lower right corner thereof. FIG. 4 illustrates an example of the section information used when the sections are identified by coordinates.

The PDL description generation unit 11 then generates PDL descriptions to locate the data items included in the data list in the predetermined sections in the PDL description form (step S113) in the printing. The PDL description generation unit 11 executes the generation process for the PDL descriptions for each pair of the data items, that is, an address and a score included in the data list. The check data generation unit 111 included in the PDL description generation unit 11 then generates the check data items for the respective generated PDL descriptions (step S114). The generation process for the check data items will be described by using FIG. 4.

In this exemplary embodiment, the sections a1 and a2 in which the data items are located in the printing are used as sections used for checking the printed material 1. The check data generation unit 111 thus processes data by using, as input data, for example, the data item for the section a1, specifically, the data item indicating an address and thereby generates a check code. In more detail, in the bitmap data generated by rasterizing the PDL descriptions, the check data generation unit 111 generates the check code by executing a predetermined process by using the image of the inner part of the section a1 as an input image. The predetermined process is an arithmetic operation, for example, using a hash function and outputs a hash value as the check code. In this exemplary embodiment, code data that is irreversible and that is uniquely decided by the image of the inner part of the section a1 is generated as the check code. The check data generation unit 111 executes the process on the section a2 in the same manner and generates a check code for the section a2. The check data generation unit 111 associates the check codes serving as first comparison information with the respective pieces of the section information corresponding to the sections a1 and a2 and generates check data items serving as check information including the section information and the first comparison information.

After generating the check data items for the respective PDL descriptions, the PDL description generation unit 11 stores the PDL descriptions in the PDL description memory 15 in association with the respective check data items (step S115). The transmission unit 12 transmits, for example, the printing target PDL descriptions to the image forming apparatus 20 via the network, for example, in response to a printing instruction from the user. At this time, the PDL description generation unit 11 generates print data with check information by adding each check data item associated with the corresponding PDL description to the PDL description and transmits the print data with check information.

Figure 6:
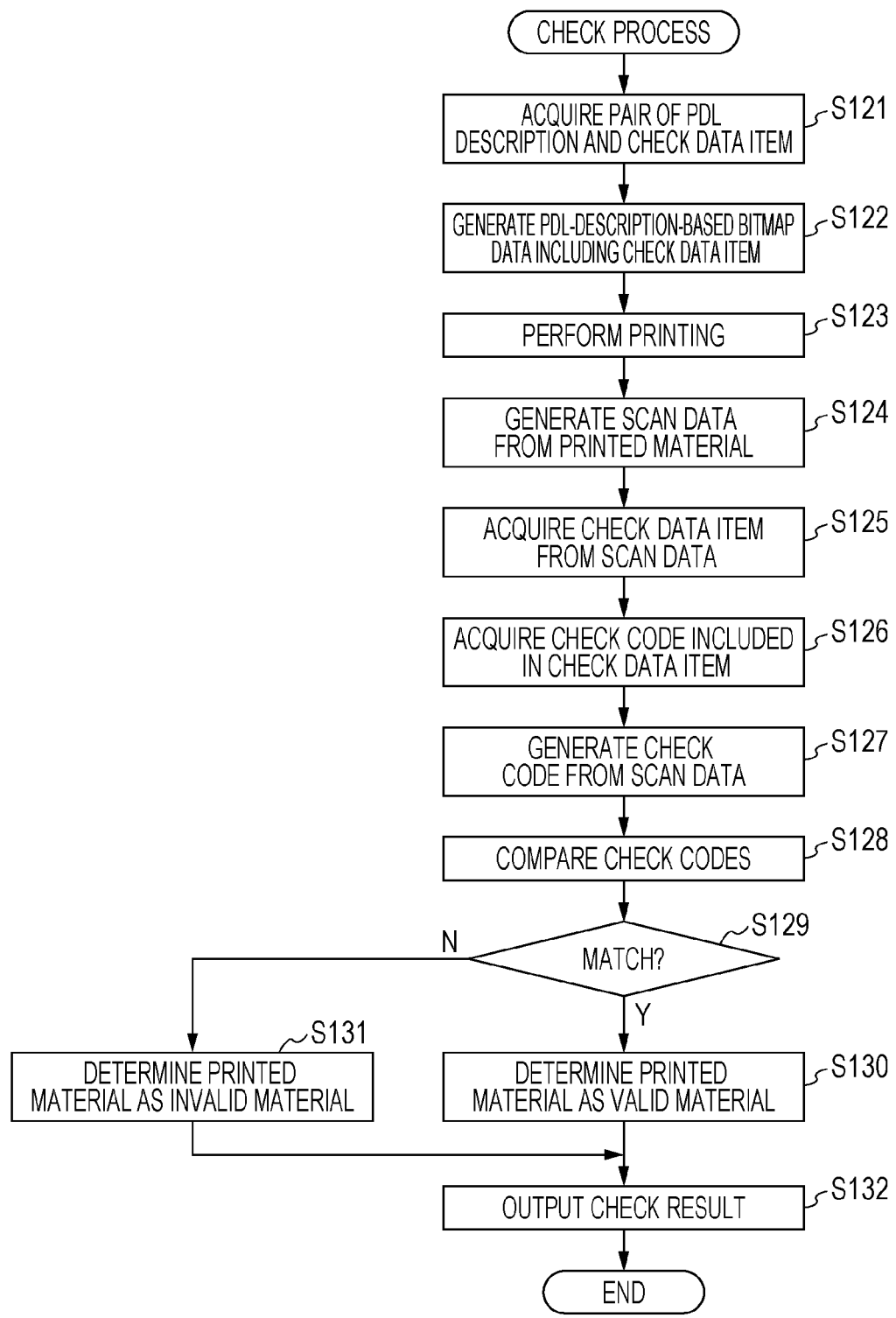
FIG. 6 is a flowchart illustrating a check process for the printed material in this exemplary embodiment.

A check process for the printed material 1 executed by the image forming apparatus 20 will be described by using a flowchart illustrated in FIG. 6. Note that PDL descriptions may be transmitted from the PC 10 to the image forming apparatus 20, but attention is herein focused on processing of one PDL description in explaining the check process because each PDL description undergoes the same process.

After the reception unit 21 receives and thereby acquires print data with check information transmitted from the PC 10, that is, a pair of a PDL description and a check data item (step S121), the rasterization unit 22 generates raster bitmap data by rasterizing the received PDL description (step S122). At this time, the check data embedding unit 221 encodes the check data item and embeds the check data item in the bitmap data generated from the PDL description. Where to embed the check data item is predetermined. After acquiring the bitmap data having the check data item embedded therein from the rasterization unit 22, the printing unit 23 performs printing on the sheet on the basis of the bitmap data (step S123).

FIG. 4 illustrates an output image of the printed material 1 generated in this manner. FIG. 4 illustrates an example in which a barcode converted from check data 5 is printed in the lower part of the printed sheet.

The image forming apparatus 20 functioning as the printed-material check apparatus then checks the printed material 1 in response to a user operation.

First, the user sets the printed material 1 on the scanner 46 and operates a predetermined button on the operation screen displayed on the operation panel 45. The reading unit 24 then generates read data (hereinafter, also referred to as scan data) by scanning the printed material 1 and stores the scan data in the scan data memory 27 (step S124). The scan data is raster bitmap data. The check unit 25 then reads out the scan data from the scan data memory 27 and checks the printed material 1 in the following manner.

First, the check unit 25 reads the encoded check data item at the predetermined embedding position and thereby acquires the check data item (step S125). The check unit 25 then decodes the read check data item and extracts and acquires a check code included in the check data item (step S126). The check code acquired in this step corresponds to a check code generated by executing the predetermined process in the PC 10 by using, as the input image, the image of the inner part of the section (that is, the sections a1 and a2) on the printed material 1 identified by the section information.

The check unit 25 also acquires the section information included in the check data item. The section including the image to be checked may thereby be identified. In this exemplary embodiment, the sections a1 and a2 illustrated in FIG. 4 may be identified. The check unit 25 generates a check code by executing the predetermined process by using, as an input image, the output image of the printed material 1, that is, the image of the inner part of the section a1 in the scan data (step S127). The predetermined process executed in this step is the same as the predetermined process executed by the check data generation unit 111 to generate a check code. Note that steps S126 and S127 may be performed in the reverse order or performed in parallel simultaneously.

The check unit 25 then compares the check code (corresponding to the first comparison information) acquired from the scan data regarding the printed material 1 in step S126 with the check code (corresponding to second comparison information) generated by executing the predetermined process on the scan data regarding the printed material 1 in step S127 (step S128).

The check codes acquired by the two methods described above ought to match because the check codes are acquired by executing the same process by using the images included in the same section as input images. Accordingly, if the check codes match in the comparison (Y in step S129), the check unit 25 determines that the printed material 1 is a valid material (step S130). In contrast, if the check codes do not match (N in step S129), the check unit 25 determines that the printed material 1 is an invalid material (step S131).

The check result output unit 26 then outputs a result of the check by the check unit 25 (step S132). The output destination does not have to be limited particularly. The check result may be displayed on the operation panel 45, stored in a file format, or transmitted to the PC 10 or a PC used by an inspector via the network. In addition, without outputting all the results of check for the respective PDL descriptions, one or more results of determination as an invalid material by the check unit 25 may be output.

In this exemplary embodiment, the printed material 1 is checked in the aforementioned manner. As described above, the printed material 1 may be checked from information regarding only the scan data regarding the printed material 1 in this exemplary embodiment. Accordingly, cooperation with the PC 10 is not required, such as transmitting some data for checking the printed material 1 to the PC 10 having generated the PDL description. In addition, the check may be performed on one printed material, and thus there is no restriction on the order in which printed materials are arranged. Specifically, a printed material may be checked completely independent from another printed material.

Figure 7:
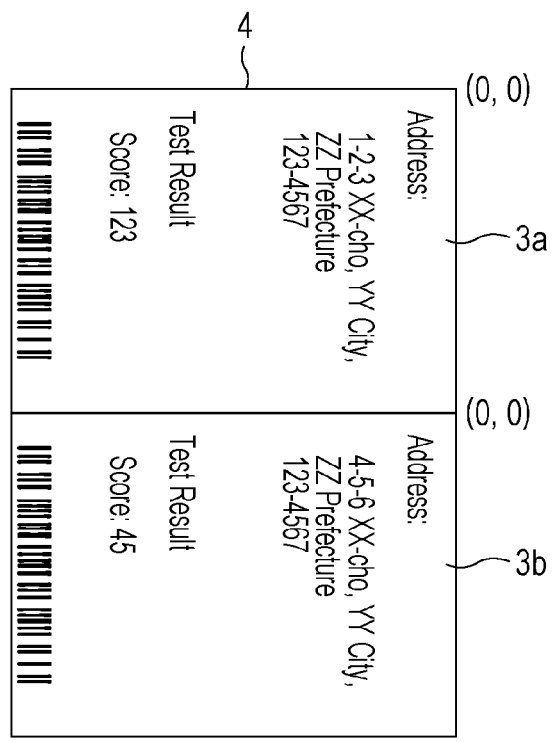
FIG. 7 is a view illustrating an example of a printed material generated in imposition printing in this exemplary embodiment.

In some cases, the printed material 1 undergoes so-called imposition printing in which pages are generated in relation to each other. FIG. 7 illustrates an example of a printed material 4 generated in such a manner that printing for print data items 3a and 3b respectively provided for two pages is performed on one sheet. In this case, predetermined positions respectively identified by the print data items 3a and 3b in the page layout, that is, the upper left corner of each laid out page in this exemplary embodiment serves as the origin (0, 0). If the process described above is executed on the print data items 3a and 3b in this state, the printed material 4 may be checked.

Note that as illustrated in FIG. 7, in the case where the printing for the print data items 3a and 3b respectively provided for two pages is performed on the one-sheet printed material 4, the print data items 3a and 3b are rotated through 90 degrees in the printing. In the example illustrated in FIG. 7, the print data items 3a and 3b are rotated clockwise through 90 degrees with respect to the orientation of the printed material 4, and thus the two-dimensional coordinate axes for the print data items 3a and 3b are accordingly rotated clockwise through 90 degrees.

As described above, when the printed material 1 is checked, only the data items included in the respective predetermined sections in the PDL description form (for example, the sections a1 and a2 illustrated in FIG. 4) are used in this exemplary embodiment. In this exemplary embodiment, variable data is set in the sections a1 and a2 in the PDL description form. For example, if the printed material 1 is an invoice, information of importance in the invoice is considered to be an amount and a billing destination, and an error of the information may lead to the occurrence of considerable trouble. Accordingly, sections in which the printing for the variable data items is performed are used as the sections used for checking the printed material 1 in this exemplary embodiment. It goes without saying that print information represented by fixed data may be used for the checking. In addition, not all of the sections including the variable data items do not have to be checked.

In this exemplary embodiment, part of the printed material 1 (for example, the sections a1 and a2 illustrated in FIG. 4) is used as a section to be checked. It may be optimum to check the entire printed material 1 from the viewpoint of a check quality; however, checking the entire printed material may lead to excessive processing load on the checking and thus adversely affect a different process in a series of processes including the checking. Hence, in this exemplary embodiment, part of the printed material 1, that is, the section in which the variable data is set is used as a section used for the checking. The processing load on the checking is thereby reduced.

In this exemplary embodiment, the image forming apparatus 20 functions as the printed-material check apparatus; however, the printed-material check apparatus may be implemented by a different apparatus functioning as a computer, such as a PC. In addition, the printing function, the scanning function, and the print-data rasterization device function of the image forming apparatus 20 are used in this exemplary embodiment; however, the functions required to implement this exemplary embodiment may be implemented by using functions of different apparatuses such as a printer, a scanner, and a rasterization device.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A printed-material check apparatus comprising:
a processor configured to:
   acquire check information including section information and first comparison information from a printed material printed on a basis of print data with check information, the section information identifying a section in print data, the first comparison information being generated from data identified by the section, the print data with check information being generated by adding the check information to the print data;
   acquire an image of an inner part of a section on the printed material, the section being identified by the acquired check information; and
   determine whether the printed material is valid by using the first comparison information and the image of the inner part of the section on the printed material.

2. The printed-material check apparatus according to claim 1,
wherein the processor is configured to:
   generate the first comparison information by executing a predetermined process by using, as an input image, an image of an inner part of the section in the print data, the section being identified by the section information;
   generate second comparison information by executing the predetermined process by using, as an input image, the image of the inner part of the section on the printed material, the section being identified by the section information; and
   determine whether the printed material is valid by comparing the first comparison information with the second comparison information.

3. The printed-material check apparatus according to claim 2,
wherein irreversible code data is generated as the first comparison information in the predetermined process.

4. The printed-material check apparatus according to claim 3,
wherein variable data is set in the section, and
wherein the first comparison information is code data uniquely decided by the data included in the section.

5. The printed-material check apparatus according to claim 1,
wherein the section information is represented by coordinate data representing a predetermined position in a page layout, the predetermined position being identified by the print data and serving as an origin, and
wherein the print data includes a plurality of pieces of print data, and the printed material is generated on a basis of the plurality of pieces of print data in relation to each other.

6. An image forming apparatus having a scanning function, comprising:
the printed-material check apparatus according to claim 1,
wherein the processor in the printed-material check apparatus according to claim 1 is configured to:
   generate read data by scanning the printed material printed on the basis of the print data with check information; and
   extract the check information from the generated read data.

7. A non-transitory computer readable medium storing a program causing a computer to execute a process comprising:
   acquiring check information including section information and first comparison information from a printed material printed on a basis of print data with check information, the section information identifying a section in print data, the first comparison information being generated from data identified by the section, the print data with check information being generated by adding the check information to the print data;
   acquiring an image of an inner part of a section on the printed material, the section being identified by the acquired check information; and
   determining whether the printed material is valid by using the first comparison information and the image of the inner part of the section on the printed material.

8. A printed-material check system comprising:
the printed-material check apparatus according to claim 1.

9. The printed-material check system according to claim 8,
wherein the processor is configured to rasterize the print data with check information,
wherein the printed-material check system further comprises:
a printer that performs printing on a basis of the print data with check information converted to image data by the processor,
wherein the printed-material check apparatus acquires the check information from an image of a printed material printed by the printer.

* * * * *